United States Patent [19]
Walsh

[11] 3,725,512
[45] Apr. 3, 1973

[54] O-LOWERALKYL-S-(2-OXOPROPYL-1) PHOSPHONODITHIOATES

[75] Inventor: Edward Nelson Walsh, Chicago Heights, Ill.

[73] Assignee: Stauffer Chemical Company, New York, N.Y.

[22] Filed: Sept. 28, 1970

[21] Appl. No.: 76,301

Related U.S. Application Data

[62] Division of Ser. No. 381,509, July 9, 1964, Pat. No. 3,564,013.

[52] U.S. Cl. ................................................260/946
[51] Int. Cl. ..................................................C07f 9/16
[58] Field of Search......................................260/946

[56] References Cited

UNITED STATES PATENTS 2,976,309   3/1961   Schrader ....................260/946 X

*Primary Examiner*—Lewis Gotts
*Assistant Examiner*—Anton H. Sutto
*Attorney*—Wayne C. Jaeschne et al.

[57] ABSTRACT

Phosphonated mercaptals and mercaptoles corresponding to the formula

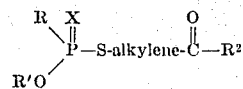

wherein "alkylene" means a divalent saturated aliphatic radical having from one to three carbon atoms; R is selected from the group consisting of lower alkyl and phenyl and R' is lower alkyl; X is selected from the group consisting of sulfur and oxygen; $R^2$ is lower alkyl of from one to three carbon atoms.

4 Claims, No Drawings

O-LOWERALKYL-S-(2-OXOPROPYL-1) PHOSPHONODITHIOATES

This application is a division of copending application Ser. No. 381,509, filed July 9, 1964 now U.S. Pat. No. 3,564,013.

The present invention is concerned with a novel group of phosphonated cyclic mercaptals, their method of preparation, and use as pesticides. Also the invention is concerned with the novel intermediates from which these pesticides are manufactured and a method of preparing the same.

The novel pesticides may be represented by the general formula

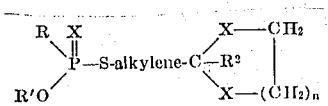

wherein "alkylene" means a divalent saturated aliphatic radical having from one to three carbon atoms; R and R' are selected from the group consisting of lower alkyl and phenyl; the groups represented by X are independently selected from the group consisting of sulfur and oxygen; $R^2$ is an alkyl from one to three carbons or hydrogen and $n$ is an integer of from 1 to 2, inclusive. The lower alkyl radicals which are suitable for R and R' are the straight and branched chain aliphatic radicals having from one to eight carbon atoms and include for example, methyl, ethyl, propyl, isopropyl, amyl, octyl, and the like. The lower alkyl radicals which are suitable for $R^2$ are the straight and branched chain aliphatic radicals having from one to three carbon atoms and include for example, methyl, ethyl, propyl, and isopropyl.

The general process for preparing the novel pesticides of the invention may be illustrated by the following reaction:

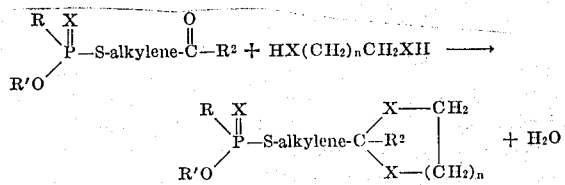

wherein R, R', $R^2$, X, n, and "alkylene" are the same as defined above. The reaction is preferably carried out in the presence of a strong acid catalyst such as boron trifluoride etherate or gaseous HCl; an inert organic solvent such as ethyl ether, benzene, and the like may be used, but is not required. Reaction temperatures during these exothermic reactions are generally maintained between 0°C. and 100°C., and a preferred temperature range is between 20°C. and 50°C. Higher temperatures may cause appreciable side products to form due to an attack by the acid catalyst. In the preferred process, the mercaptans are added to the phosphonated aldehyde or ketone reactant before addition of the catalyst. Although the order of addition may have some slight effects on yields, it is not a critical feature of the invention.

Recovery of a pure phosphonated cyclic mercaptal from the reaction mixture may be accomplished by washing the reaction mixture to remove side products, unreacted compounds, and the acid catalyst. For convenience, the reaction mixture may first be dissolved in an inert organic solvent such as benzene, ether, and the like, and then washed. The washing may be accomplished with water or aqueous solutions of sodium bicarbonate, sodium sulfate, etc. (to remove the unreacted aldehyde or ketone). Normally the reaction will yield between 71 and 97 percent of the theoretical predicated amount of phosphonated cyclic mercaptal.

The following examples illustrate specific pesticides of the invention and their method of preparation, but should not be construed as limiting the broader aspects of the invention.

EXAMPLE 1

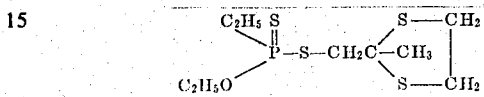

To 6.0 grams of $(C_2H_5)(C_2H_5O)P(S)$-S-$CH_2C(O)(CH_3)$ contained in a reactor flask fitted with a stirrer and thermometer was added 2.5 grams of ethandithiol. The reactants were dissolved in 5 ml. of ethyl ether and 0.5 ml. of boron trifluoride etherate was added to catalyze the reaction. A mild exothermic reaction ensued; the temperature was held at 30°C. to 35°C. After stirring for 16 hours, 100 ml. of ethyl ether was added, and the reactants were washed with 100 cc. of water. The reactants were counterwashed with 50 cc. of ethyl ether and 50 cc. of water; then filtered and concentrated to 60°C. under 1 mm. Hg. The concentrated product consisted of 7.0 grams (87 percent yield) of 2-methyl-2-(O-ethyl ethylphosphonodithiomethylene) 1,3-dithiolane having an index of refraction $N_D^{25} = 1.5458$ and analysis of 11.7% P and 33.9% S as compared to 10.2% P and 42.4% S, theoretical.

The following compounds were prepared by a procedure substantially in accordance with Example 1.

EXAMPLE 2

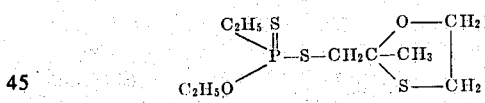

2-methyl-2-(O-ethyl ethylphosphonodithiomethylene)-1,3-oxathiolane; having an index of refraction $N_D^{25} = 1.5520$, and analysis of 10.8% P and 33.5% S as compared to 10.8% P and 32.1% S, theoretical.

EXAMPLE 3

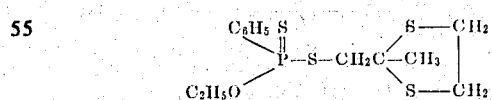

2-methyl-2-(O-ethyl phenylphosphonodithiomethylene)-1,3-dithiolane; having an analysis of 9.1% P and 31.5% S as compared to 8.9% P and 36.5% S, theoretical.

EXAMPLE 4

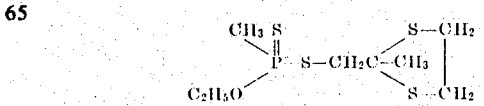

2-methyl-2-(0-ethyl methylphosphonodithiomethylene)-1,3-dithiolane; having an index of refraction $N_D^{25}= 1.5899$, and an analysis of 10.4% P and 41.0% S as compared to 10.7% P and 44.4% S, theoretical.

EXAMPLE 5

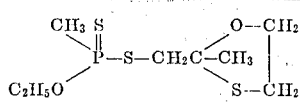

2-methyl-2-(0-ethyl methylphosphonodithiomethylene)-1,3-oxathiolane; having an index of refraction $N_D^{25}= 1.5571$, and an analysis of 11.3% P and 33.4% S as compared to 11.4% P and 35.0% S, theoretical.

The novel phosphonated aldehyde or ketone intermediates useful in the preparation of the novel pesticides of the invention may be represented by the general formula

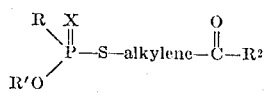

wherein "alkylene", R, R', R² and X are the same as defined hereinbefore for the novel pesticides.

The general process for preparing the novel intermediates of the invention may be illustrated by the following reaction:

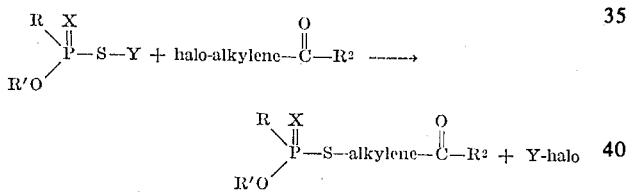

wherein "halo" means a halogen radical such as chlorine, bromine or iodine; Y means an alkali metal to include for example, sodium and potassium; and all of the other substituents are the same as defined hereinbefore. Reaction temperatures, while they need not be critically controlled during these mildly exothermic reactions are normally maintained between about 0°C. and 100°C., preferably between 20°C. and 50°C. Normally the reaction will yield between 75 and 97.5 percent of the theoretical predicted amount of phosphonated intermediate.

EXAMPLE 6

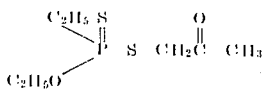

To 21.2 grams of sodium nd 700 ml. ethanol contained in a reactor flask fitted with a thermometer and stirring rod, while the temperature was maintained between 25°C. and 30°C., was added hydrogen sulfide until the solution was acidic to phenolphthalein. While maintaining the temperature of the reactants at 25°C., 50.0 grams of ethyl phosphonodichloridothionate was added dropwise over a period of 25 minutes. After stirring for an additional 30 minutes at 25°C., the mixture was heated to 50°C. and stirred for 30 minutes longer. Then, 28.0 grams of chloroacetone was added dropwise over a period of six minutes while maintaining the temperature of the mixture between 20°C. and 25°C. The mixture was stirred for 30 minutes at 25°C. and then stirred at reflux for one hour. After cooling and filtering, the mixture was concentrated to 60°C. under 1 mm. Hg. The concentrated product consisted of 51.7 grams (75 percent yield) of 0-ethyl-S-(2-oxopropyl-1)-ethylphosphonodithioate having an index of refraction $N_D^{25}= 1.5309$ and analysis of 12.7% P and 28.6% S compared to 13.7% P and 28.3% S, theoretical.

The following specific compounds were prepared by a procedure substantially in accordance with that of Example 1:

EXAMPLE 7

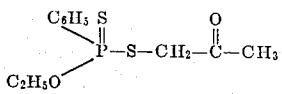

0-ethyl-S(2-oxo-propyl-1)-phenylphosphonodithioate having an index of refraction $N_D^{25}= 1.5865$, and analysis of 11.7% P and 23.9% S as compared to 11.3% P and 23.3% S, theoretical.

EXAMPLE 8

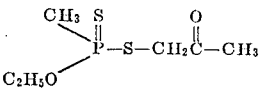

0-ethyl-S-(2-oxo-propyl-1)-methylphosphonodithioate having an index of refraction $N_D^{25}= 1.5360$, and analysis of 14.1% P and 30.1% S as compared to 14.6% P and 30.2% S, theoretical.

Although the new phosphonated cyclic mercaptals have been found to be generally active as pesticides, their miticidal activity, especially with the two-spotted mite, Tetranychus telarius, is unexpectedly high. Insecticidal activity for the phosphonated cyclic mercaptals is illustrated in Table I wherein the percentage kill among the pest species is reported for a specified quantity of candidate compound, expressed in micrograms (μg-herein termed the bioassay test), or for a percentage concentration in aqueous dispersion (hereinafter termed the screening test). A slanted line is used to separate the percentage kill for the pest species shown on the left from the percentage concentration (screening) or total quantity (bioassay) shown on the right.

| Insect Pest Species | |
|---|---|
| Housefly | Musca domestica (Linn.) |
| American cockroach | Periplaneta americana (Linn) |
| German cockroach | Blatella germanica (Linn) |
| Spotted milkweed bug | Oncopeltus fasciatus (Dallas) |
| Mite Test Species | |
| Two-spotted mite | Tetranychus telarius (Linn) |

TABLE I.—MORTALITY OF REPRESENTATIVE SPECIES OF COMMON INSECT ORDERS AND MITES

| Compound (example number, see supra) | M. domestica | P. americana | B. germanica | O. fasciatus | T. telarius Post embryonic | Nymphs | Eggs | Systemic, p.p.m. |
|---|---|---|---|---|---|---|---|---|
| 1, μg | 50/0.1 | | | 50/0.1 | 50/0.01 | 50/0.01 | | 50/3 |
| 2, μg | 50/30 | 50/0.03 | | 50/0.01 | 50/0.01 | 50/0.01 | 50/0.03 | 50/.85 |
| 4, μg | 50/25 | 50/0.05 | 50/0.05 | 50/0.03 | 50/0.005 | 50/0.01 | 50/0.01 | 50/1 |
| 5, μg | 50/10 | 50/0.03 | 50/0.1 | 50/0.03 | 50/0.005 | 50/0.005 | 50/0.03 | 50/1 |

In the screening tests for the insect species of Table I, from 10 to 25 insects were caged in cardboard mailing tubes 3⅛ inches in diameter and 2⅝ inches tall. The cages were supplied with cellophane bottoms and screen tops. Food and water were supplied to each cage. Dispersions of the test compounds were prepared by dissolving one-half gram of the toxic material in 10 ml. of acetone. This solution was then diluted with water containing 0.0175% v/v Sponto 221, an emulsifying agent, the amount of water being sufficient to dilute the active ingredients to a concentration of 0.1 percent or below. The test insects were then sprayed with this dispersion. After 24 and 72 hours, counts were made to determine living and dead insects.

Some of the compounds which showed high mortality on house flies in the screening test were bioassayed on M. domestica. In this test, a known quantity of the toxicant was placed in a confined area. The same cages were employed as for the fly screening test. A weighed amount of the toxicant was placed in pyrex petri dishes having a surface area of 18.8 sq. centimeters along with 1 ml. of acetone. After the solvent was evaporated by air-drying, a cage containing groups of 25 female flies, three to five days old, was placed over the residue. Counts of living and dead insects were made 48 hours after initiation of the test.

It has been further found that the compounds of the present invention are excellent systemic miticides. In testing for systemic action, pinto bean plants were placed in bottles containing 200 ml. of the test solution and were held in place with cotton plugs. Only the roots were immersed. The solutions were prepared by dissolving the candidate miti-cide in acetone or other suitable solvent and then diluting with tap water. The final acetone concentration of the solu-tion was never allowed to exceed 1 percent and the toxicant was initially tested at a concentration of 100 p.p.m. As soon as the plants were placed in the solution, they were infested with mites. Mortalities of post embryonic, nymph and ovicidal forms were determined seven days after initiation of the test.

Although the above tests were accomplished with aqueous dispersions, the toxic compounds can also be used commercially in the form of aqueous solutions when appreciably soluble, non-aqueous solutions, wettable powders, vapors, and dusts as best suited to the conditions of use. In many applications, fillers will be incorporated with the toxic compounds. For more specialized applications, the material may even be used in its pure, undiluted form.

When used herein the term "pest" is intended in the restricted sense generally recognized in the art as applying to the lower forms of life customarily controlled by chemical means and excluding the higher animals, the vertebrates, for example, rodents, birds, and larger forms which are more commonly controlled by mechanical means such as traps. It will be apparent to one skilled in the art that the toxic activity demonstrated hereinbefore on various test species is indicative of activity with species and orders not specifically shown.

The foregoing description is given for clearness of understanding only and no unnecessary limitations should be understood therefrom, as modifications will be obvious to those skilled in the art.

I claim:

1. A compound having the formula:

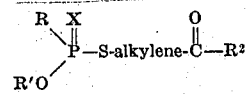

wherein "alkylene" means a divalent saturated aliphatic radical having from one to three carbon atoms; R is selected from the group consisting of lower alkyl and phenyl and R' is lower alkyl; X is selected from the group consisting of sulfur and oxygen; R² is lower alkyl of from one to three carbon atoms.

2. 0-ethyl-S-(2-oxopropyl-1)-ethylphosphonodithioate.

3. 0-ethyl-S-(2-oxopropyl-1)-phenylphosphonodithioate.

4. 0-ethyl-S-(2-oxopropyl-1)-methylphosphonodithioate.

* * * * *